United States Patent [19]

Schwan

[11] 4,259,382
[45] Mar. 31, 1981

[54] FIBER REINFORCED COMPOSITE SHAFT WITH METAL CONNECTOR SLEEVES SECURED BY ADHESIVE

[75] Inventor: Frank J. Schwan, Fremont, Calif.

[73] Assignee: Celanese Corporation, New York, N.Y.

[21] Appl. No.: 43,555

[22] Filed: May 29, 1979

[51] Int. Cl.³ .......................... B32B 5/12; F16C 1/02
[52] U.S. Cl. ...................... 428/36; 64/1 R; 64/1 S; 156/172; 156/189
[58] Field of Search ............... 156/172, 189, 173, 175; 273/80 R; 64/1 R, 1 S, 2 R, 16, 27 R; 428/36; 285/91, 238, 239; 138/130-132

[56] References Cited

U.S. PATENT DOCUMENTS

| 2,882,072 | 4/1959 | Noland | 138/138 |
| 3,467,764 | 9/1969 | Knapp | 285/239 |
| 3,592,884 | 7/1971 | Williams | 64/1 R |
| 3,661,670 | 5/1972 | Pierpont, Jr. | 156/172 |
| 4,000,759 | 1/1977 | Higbee | 138/130 |
| 4,023,835 | 5/1977 | Ewing et al. | 138/130 |
| 4,041,599 | 8/1977 | Smith | 29/451 |
| 4,089,190 | 5/1978 | Worgan et al. | 64/1 R |
| 4,097,626 | 6/1978 | Tennent | 428/36 |
| 4,171,626 | 10/1979 | Yates et al. | 428/36 |

FOREIGN PATENT DOCUMENTS 1356393  6/1974  United Kingdom ............ 156/189

Primary Examiner—William J. Van Balen
Attorney, Agent, or Firm—Kenneth A. Genoni

[57] ABSTRACT

A tubular fiber reinforced composite shaft comprises a shaft body formed of a plurality of integrally bonded circumferential plies of solidified fiber reinforced resinous material. A metal sleeve is mounted in at least one end of the shaft body. A layer of adhesive material is disposed between an outer surface of the metal sleeve and an inner surface of the shaft body to bond the sleeve to the body. A portion of the body located adjacent an inner end of the adhesive layer is of enlarged radial thickness. A portion of the sleeve located adjacent the inner end of the adhesive layer may be of enlarged radial thickness.

9 Claims, 5 Drawing Figures

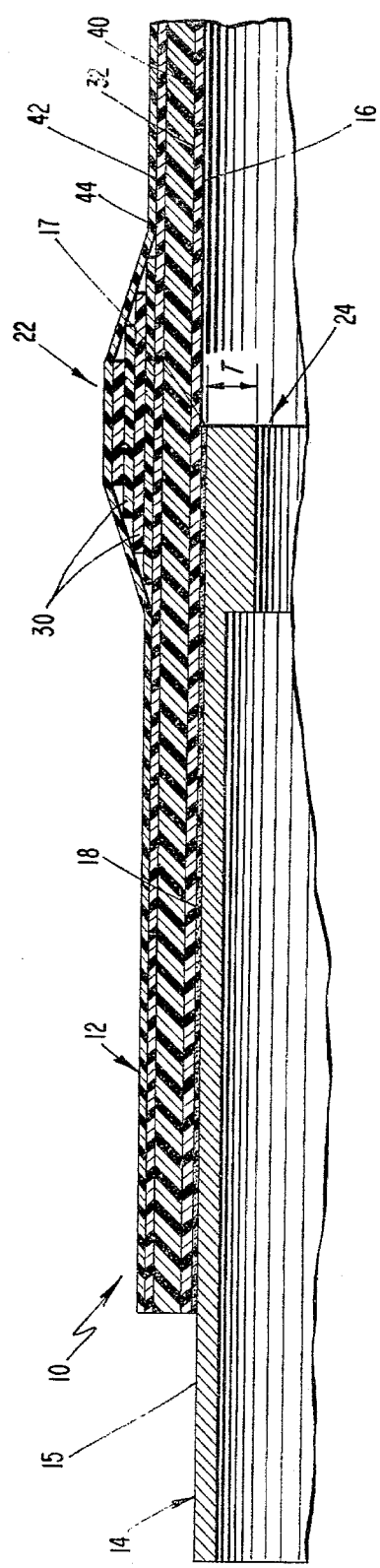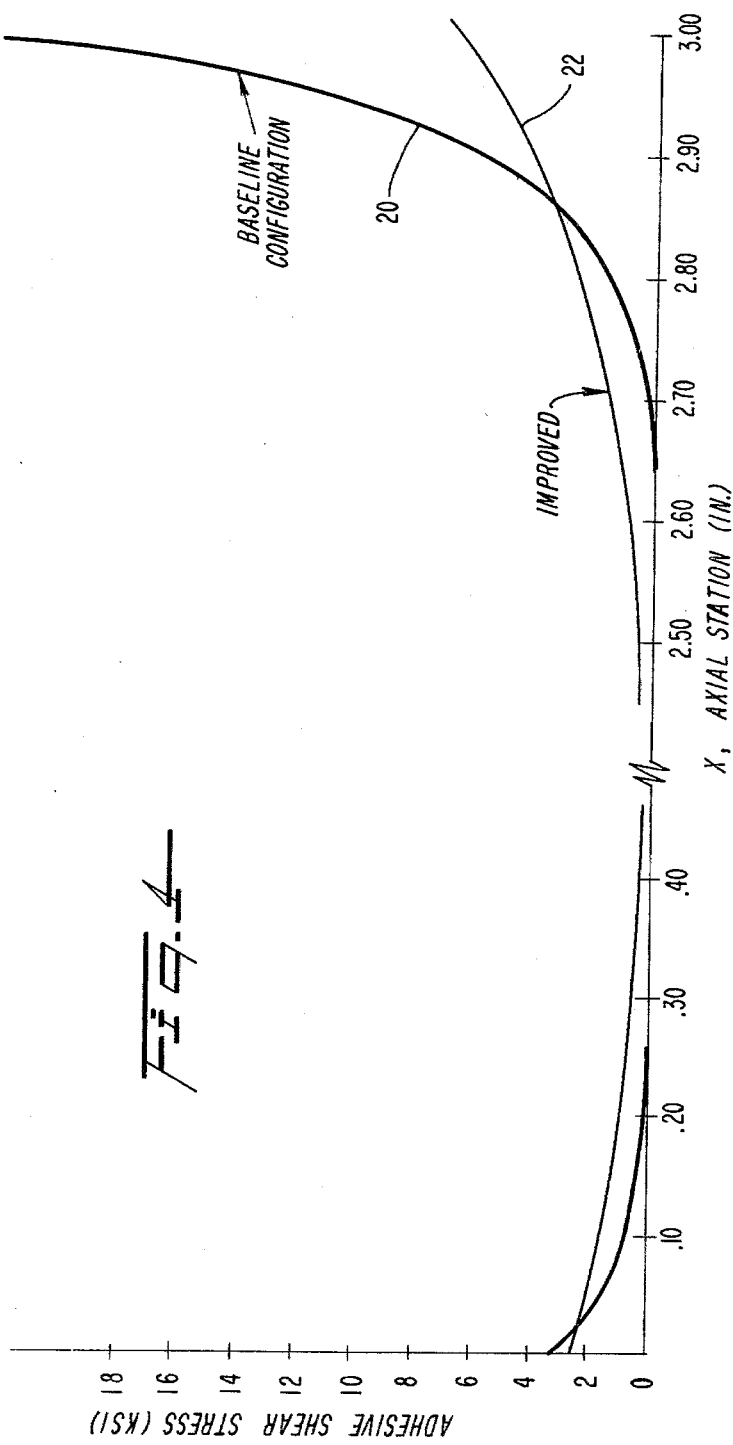
Fig. 4

4,259,382

FIBER REINFORCED COMPOSITE SHAFT WITH METAL CONNECTOR SLEEVES SECURED BY ADHESIVE

BACKGROUND AND OBJECTS OF THE INVENTION

This invention relates to fiber reinforced composite shafts and, more especially, to vehicle drive shafts comprising a fiber reinforced resinous shaft body with metallic coupling sleeves mounted at the ends thereof.

Tubular fiber reinforced composites have been heretofore proposed, as demonstrated by U.S. Pat. Nos. 2,882,072 issued to Noland on Apr. 14, 1959, and 3,661,670 issued to Pierpont on May 9, 1972, and in British Pat. No. 1,356,393 issued on June 12, 1974. In the Pierpont patent, for example, it has been proposed to form such composites from a resinous material which is reinforced by glass fibers. In particular, filaments bearing a non-hardened resinous material (i.e., an uncured thermosetting resin) are wound around a mandrel until the desired thickness has been established. The reinforcing fibers can be positioned within the wall of the tubular composite in varying angular relationships. Thereafter, the resinous material is solidified (i.e. is cured). A premolded threaded end portion can be mounted at the ends of the tubular composite, such as by the winding of filaments directly around the end portion during the winding process.

It recently has been proposed to form vehicle drive shafts from tubular fiber reinforced composites, as demonstrated by U.S. Pat. No. 4,041,599 issued to Smith on Aug. 16, 1977, and published Japanese Application No. 52-127542, entitled "Carbon Fiber Drive Shaft" which claims priority for the filing of U.S. Ser. No. 676,856 on Apr. 14, 1976 of Gordon Peter Worgan et al (now U.S. Pat. No. 4,089,190). In the Japanese application filaments bearing a non-hardened resinous material (e.g., an uncured thermosetting resin) are wound around a mandrel until the desired thickness has been established, whereupon the resinous material is cured. Zones or layers are positioned circumferentially within the wall of the shaft in the specific angular relationships there disclosed.

The above-mentioned Smith patent proposes the attachment of a carbon fiber reinforced epoxy drive shaft directly to a universal joint extension by a specific bonding technique.

Fiber reinforced composite shafts exhibit advantages over metallic shafts, i.e., they are lighter in weight, more resistant to corrosion, stronger, and more inert.

In copending application Ser. No. 890,232 filed Mar. 27, 1978 of Derek N. Yates and David B. Rezin entitled "Improved Carbon Fiber Reinforced Composite Drive Shaft", a fiber reinforced composite drive shaft is disclosed which exhibits improved service characteristics and the necessary strength and durability to withstand the various stresses encountered during vehicle operation. The disclosure of that copending application is herein incorporated by reference as if set forth at length.

Since direct welding or bonding of a resin shaft to metal does not normally create a sufficiently strong and durable connection on a consistent and reliable basis, the use of metallic connector sleeves mounted at the ends of the shaft in accordance with the concept of the present invention provides a means for accomplishing a secure welded connection similar to that utilized with conventional metallic shafts.

The high torque loads which are to be transmitted by a vehicle drive shaft require that an extremely strong and durable torsional drive connection be established between the sleeves and shaft body. Previous proposals for mounting sleeves solely by employing adhesives cannot be relied upon to provide a connection of the requisite strength and durability in the face of the substantial shear stresses which are encountered.

In copending application Ser. No. 890,230 of Derek N. Yates and John C. Presta filed Mar. 27, 1978, and entitled "Fiber Reinforced Composite Shaft With Metallic Connector Sleeves Mounted by Radial Pin Interlock", a proposal is made for joining metal sleeves to a composite shaft body by means of a mechanical interlock. While such a connection is assuredly of ample strength and durability, it may be more costly to produce in comparison to a connection comprised solely of adhesive.

It is, therefore, an object of the present invention to provide a novel, fiber reinforced resin shaft which minimizes or obviates problems of the types discussed above.

It is an additional object of the invention to provide a novel, fiber reinforced resin shaft suitable for use as a drive shaft in a vehicle power train.

It is a further object of the invention to enable metal connector sleeves to be secured by an adhesive to the ends of fiber reinforced resin shafts to enable the shafts to transmit high torsional loads.

BRIEF SUMMARY OF THE INVENTION

These objects are achieved by the present invention involving a tubular fiber reinforced composite shaft involving a shaft body formed of a plurality of integrally bonded circumferential plies of solidified fiber reinforced resinous material. A metal sleeve is mounted in at least one end of the shaft body. A layer of adhesive material is disposed between an outer surface of the metal sleeve and an inner surface of the shaft body to bond the sleeve to the body. A portion of the body located adjacent an inner end of the adhesive layer is of enlarged radial thickness. The locally enlarged portion of the body reduces the disparity between the torsional stiffness of the body and that of the sleeve and reduces the peak shear stress occurring in the adhesive layer.

THE DRAWING

The objects and advantages of the present invention will become apparent from the following detailed description of a preferred embodiment thereof in connection with the accompanying drawing in which like numerals designate like elements and in which:

FIG. 3 is an enlarged fragmentary view of the shaft taken in longitudinal section;

FIG. 4 is a chart depicting the analytically predicted shear stress pattern in the adhesive layers in a shaft according to the present invention and a shaft formed in accordance with prior art proposals.

DETAILED DESCRIPTION OF A PREFERRED EMBODIMENT OF THE INVENTION

Figure 1:
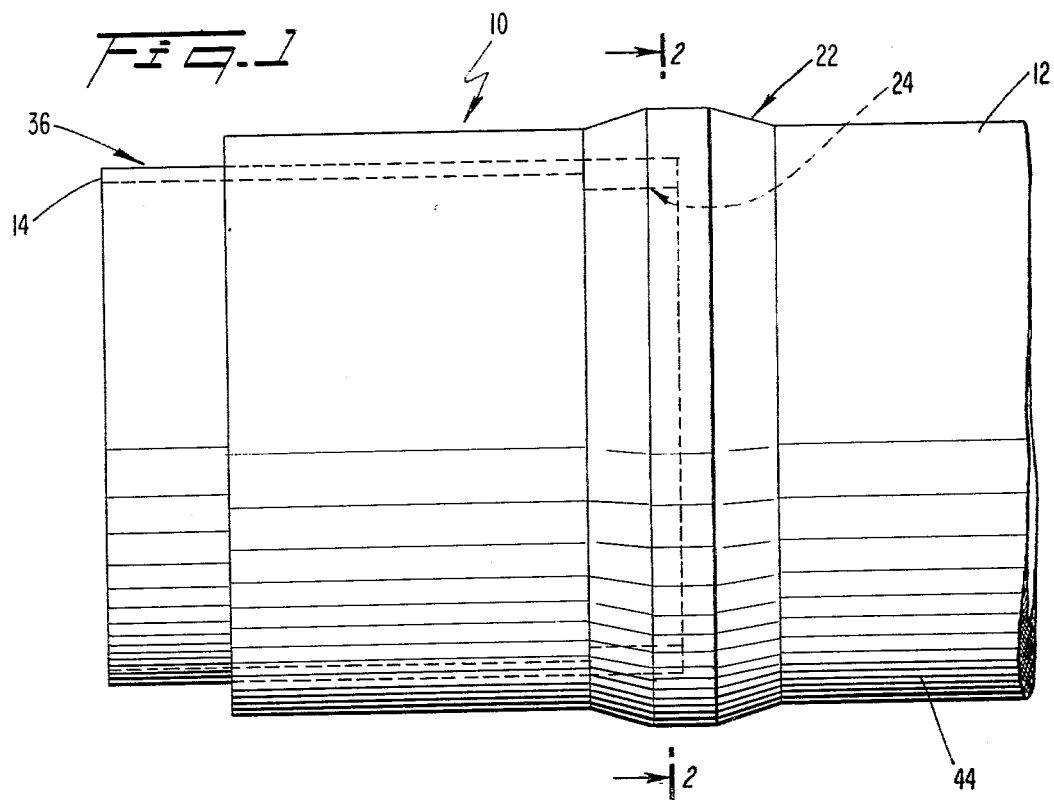
FIG. 1 is a side elevational view of one end of a shaft according to the present invention.
Figure 2:
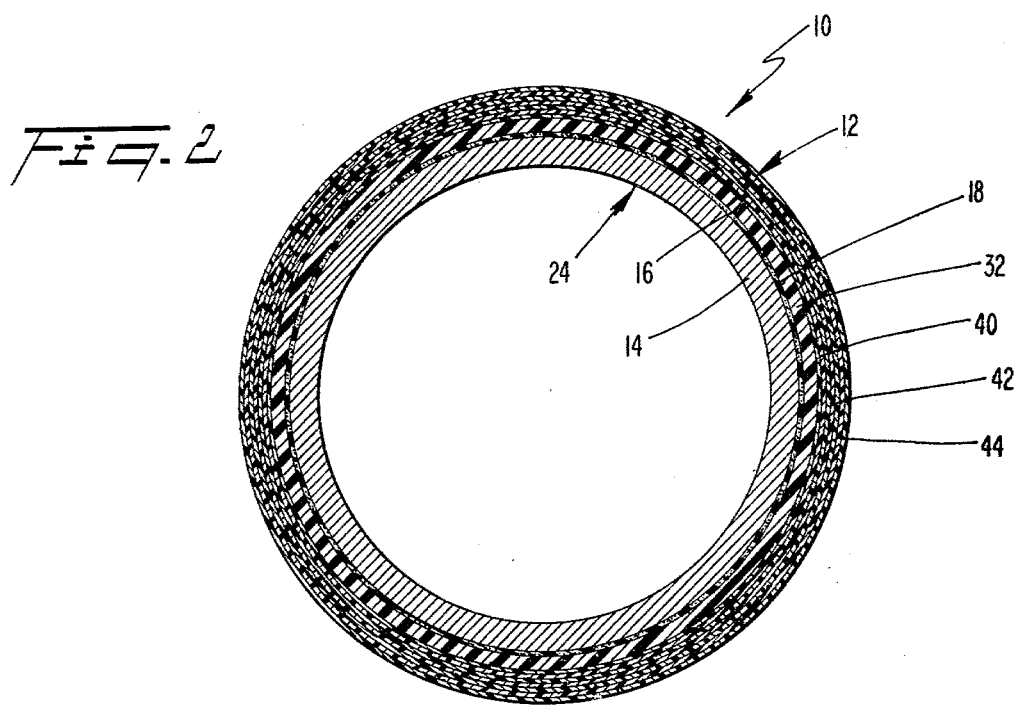
FIG. 2 is a cross-sectional view taken along line 2—2 in FIG. 1.
Figure 5:
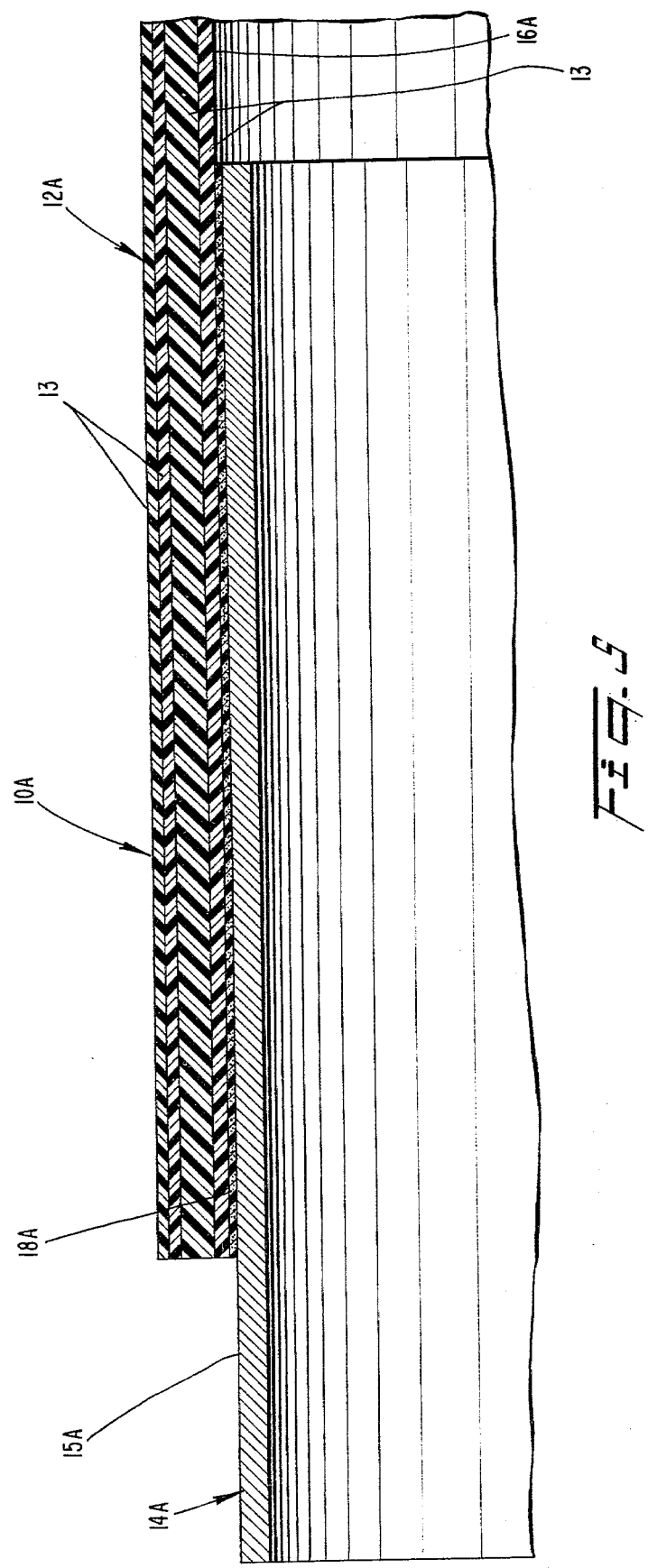
FIG. 5 is a view similar to FIG. 2 of a composite shaft without enlargements of the shaft body and metal sleeve adjacent the inner end of the adhesive layer.

In FIG. 5 there is depicted a drive shaft 10A which comprises a metal sleeve 14A connected to a composite shaft body 12A. The composite body 12A may be of the type which comprises layers 13 of fiber reinforced resin-impregnated material, as described for example in U.S. Pat. Nos. 3,661,670; 3,202,569; and 3,231,442. The sleeve comprises an essentially cylindrical outer surface 15A which is joined to a corresponding cylindrical inner surface 16A of the shaft body 12A. An adhesive layer 18A between the surfaces 15A, 16A is intended to bond the surfaces together and prevent relative rotation therebetween about the longitudinal axis of the shaft, to enable the shaft to transmit torsional forces. However, the ability of such an arrangement to exhibit the necessary durability and dependability is highly questionable.

The present inventor has analyzed connections of that type and has predicted the distribution of shear stress along the length of the joint. An exemplary shear stress pattern is represented by a line 20 in the graph of FIG. 4. The abscissa of the graph represents the length of the adhesive joint from the longitudinal outer end (point zero) to the longitudinal inner end (point 3.0), whereas the ordinate represents the shear stress which occurs along the length of the adhesive layer.

The inventor has thus determined that considerable peak levels of shear stress occur at a critical location adjacent the longitudinal inner end of the adhesive layer, which levels are of a relatively high magnitude, tending to cause failure of the adhesive layer.

Accordingly, the present inventor has devised an arrangement which minimizes the chances for such failures to occur.

More particularly, the present invention involves a configuration of a composite body 12 and/or a metal connector sleeve 14 which significantly reduces the peak shear stresses occurring in the adhesive layer.

With reference to FIG. 3, it will be seen that, in accordance with the present invention, a shaft 10 comprises a metal sleeve 14 formed of steel or aluminum for example, and a composite shaft body 12. An adhesive layer 18 joints an outer surface 15 of the sleeve to an inner surface 16 of the body 12. A portion 22 of the shaft body 12 located at a longitudinal inner or inboard end 24 of the sleeve 14 (corresponding to the inner end 17 of the adhesive layer 18) has been built-up to an enlarged thickness. In addition, but not necessarily, the longitudinal inner end 24 of the sleeve 14 is of an enlarged radial thickness T.

By reinforcing the composite body 12 in such manner at the longitudinal inner end of the adhesive layer, there is produced an increase in the torsional stiffness of the body 12 at the critical location 17 which reduces (or possibly eliminates) the disparity between the relative torsional stiffness of the body 12 and the sleeve 14 at that location 17. In so doing, it has been found that a less severe load transfer occurs at the location 17, and the shear stress developed in the adhesive layer at the location 17 can be significantly reduced.

By also increasing the thickness of the sleeve at the critical location, the overall torsional rigidity of the shaft is increased at the location 17. Thus, the tendency for the shaft (sleeve and composite body as a unit) to twist is reduced at the location 17. As a result, the shear stress developed in the adhesive joint at the critical location 17 is somewhat reduced.

It should be emphasized that a more pronounced decrease in adhesive shear stress results from the local enlargement of the body 12, than from the local enlargement of the sleeve 14. Accordingly, it may be preferred to only enlarge the body 12. Of course, if the sleeve 14 is also enlarged at the location 17, it would be necessary to further increase the thickness build-up of the portion 22 of the body 12 more than would otherwise be performed, in order to offset the resultant increase in torsional stiffness of the sleeve.

It has been found that the local reinforcement 24 of the sleeve 14 may be of a stepped nature, as depicted, or a more gradual tapering at the location 17.

Building-up of the composite body 12 at the critical location 17 is preferably achieved by adding a plurality of layers 30 of fiber-reinforced resin impregnated material (e.g., four to ten layers 30 are preferably added). Successive ones of the layers 30 are preferably reduced in length to form a stepped configuration whereby the wall thickness of the body 12 gradually increases as the critical location 17 is approached.

During fabrication of a preferred form of the shaft, a pair of connector sleeves 14 is positioned on segments of a cylindrical mandrel in a longitudinally spaced relationship, as discussed in copending applications Ser. Nos. 890,230 and 890,231 of Derek N. Yates and John C. Presta, both filed Mar. 27, 1978 and assigned to the assignee of the present invention. Those copending applications are incorporated herein by reference as if set forth at length. The sleeves engage the mandrel somewhat snugly, but loosely enough to be removable therefrom. An appropriate clamping arrangement holds the sleeve 14 in place. The mandrel is coated with a release substance to resist the adherence thereto of resin or adhesives. A layer 18 of adhesive is applied to the outer surfaces of the sleeves. Thereafter, the composite body 12 is formed around both the mandrel and sleeves.

Construction of the shaft composite body 12 is preferably performed in a manner more fully described in the aforementioned application of Yates and Rezin. Summarized briefly, layers of fiber reinforced resin-impregnated material are applied, preferably in the form of bundles of substantially parallel continuous filaments bearing a non-solidified (i.e., liquid, soft and tacky, or molten) resinous material. The bundles can be dipped in an uncured liquid thermosetting resin, such as an epoxy resin, and then wound around the mandrel in multiple passes until a layer of desired thickness is established. Attention is further directed to U.S. Pat. Nos. 3,661,670, 3,202,560, and 3,231,442 for additional details concerning possible arrangements for the clamping of sleeves and winding of filament bundles. The disclosures of these patents are incorporated herein by reference as if set forth at length.

The term "layer" as used herein specifies a circumferential zone within the wall of the tubular drive shaft wherein the fibrous reinforcement is disposed in a specific configuration and differs from the adjacent zone(s) with respect to the configuration and/or composition of the fibrous reinforcement. A single layer may include a multiple pass alignment or build-up of fibrous reinforcement in a given configuration. The term layer encompasses an alignment wherein the fibrous reinforcement is disposed therein at both plus and minus a given angle which optionally can be built-up in multiple passes.

The fibers reinforce the thermoset resin matrix to impart necessary properties of strength and durability to the shaft. In this regard, glass fibers (e.g., E-glass or S-glass) and carbon fibers (i.e., either amorphous or graphitic) materials are preferred. The carbon fibers commonly contain at least 90 percent carbon by weight, and preferably at least 95 percent carbon by weight. Additionally preferred carbon fibers have a Young's modulus of elasticity of at least 25 million psi (e.g., approximately 30 to 60 million psi).

The plies of filament bundles are wound in various orientation relative to the longitudinal axis of the drive shaft, and can be built-up to different thicknesses, respectively. Preferably, an initial layer of glass fibers is applied at an angle of from $\pm 30°$ to $\pm 50°$ relative to a line parallel to the longitudinal axis of the shaft. Next, a layer of glass fibers is applied at an angle of from 0° to $\pm 15°$. Thereafter, a layer of carbon fibers is applied at an angle of from 0° to $\pm 15°$. Then a layer of glass fibers is applied at about an angle of from about $\pm 60°$ to 90°.

Of course the number and composition of layers, as well as their orientation and thickness may vary, depending upon the characteristics desired to be imparted to the shaft.

Rather than utilizing filament winding (e.g., wet winding or prepreg winding), other tube forming procedures can be employed, such as tube rolling, tape wrapping, or pultrusion, for example. In the former step, comparatively wide sections of resin impregnated tape are precut to patterns, stacked in sequence, and rolled onto the mandrel.

After the layers have been applied, the non-solidified resin is cured. In this regard, the resin may be of a self-curing type, or may be of a kind which cures in response to being subjected to heat and/or curing agent.

More particularly, after the sleeve(s) 14 has been positioned on the mandrel, and a layer 18 of adhesive has been applied thereto, an initial layer 32 of glass fibers is wound around the adhesive layer and the mandrel at about a $\pm 45$ degree angle.

Thereafter, a layer 40 of glass fibers is wound around the layer 32 at about a zero degree angle.

Next, a layer 42 of graphite fibers is wound around the layer 40 at about a zero degree angle.

Then, the plurality of shorter layers 30 are wound around the layer 42 at the critical location at about $\pm 45$ degree angle to form a gradually increasing radial thickness 22 of the composite body 12 as the critical location is approached. Four layers 30 are depicted, which is within a preferred range of about 4 to 10 additional layers.

Finally, a layer 44 of glass fibers is wound at about a 90 degree angle around the layer 42 and the added layers 30.

Thereafter, the non-solidified resin is cured to bond all of the layers together to form an integral composite body, and the adhesive is cured to join the composite body to the sleeve. Finally, the shaft is removed from the mandrel.

An axially outer portion 25 of the sleeve 14 is exposed, preferably by removing portions of the layers.

In one instance a steel sleeve of 3.5 in. outer diameter and 0.08 in thickness was analyzed. The sleeve extends about three inches into the composite body, the latter being of 0.13 inches in radial thickness. An adhesive layer 0.015 inches in thickness and three inches in length is applied to the interface between the sleeve and composite body. Various resins are suitable, although an adhesive which has been found to be preferable is made by Ren Adhesives Co. and purchased under the name Ren-Weld Epoxy Adhesive (RP-136). A Ren hardener No. H-994 is used in conjunction with the adhesive. In one instance an adhesive was employed which exhibited a shear strength modulus of $0.107 \times 10^6$ psi.

The four added layers 32 produced an increased radial thickness of 0.04-0.1 inches in the body 12 at the critical location 17.

The inner end of the sleeve was provided with an increased radial thickness of from 0.02 to 0.04 inches along a length of from 0.5 to 1.0 inches.

In the aforementioned chart in FIG. 4, there is depicted the shear stress pattern 22 along the adhesive of a shaft formed with build-ups in the composite body and sleeves in accordance with the invention, and a shear stress pattern 20 of a corresponding shaft formed without such buildups. It will be appreciated that the peak shear stress occurring at the inner end of the adhesive layer is markedly lower in the shaft formed in accordance with the present invention.

It will be understood that the reinforced portions 22, 24 of the body 12 and sleeve 14, respectively, are located adjacent the longitudinally inner end of the adhesive layer 18, wherever along the sleeve 14 such end may lie.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

We claim:

1. A hollow tubular fiber reinforced composite shaft comprising:
 a shaft body comprising a plurality of integrally bonded circumferential plies of solidified fiber reinforced resinuous material,
 a metal sleeve mounted in at least one longitudinal end of said shaft body and including a radially outer surface,
 a layer of adhesive material disposed radially between said outer surface of said metal sleeve and an inner surface of a radially innermost ply of said shaft body to bond said sleeve to said body,
 said radially innermost ply and said adhesive layer overlying substantially the entire portion of said outer surface disposed within said shaft body, said portion of said outer surface being of substantially constant radius along its longitudinal extent,
 a portion of said body located adjacent an inner longitudinal end of said adhesive layer and in overlying relation to said constant radius portion of said outer surface as viewed in a radially inward direction being of enlarged radial thickness relative to the remainder of said body disposed longitudinally outwardly of said enlarged thickness portion.

2. A shaft according to claim 1, wherein a portion of said sleeve located radially adjacent said inner end of said adhesive layer is of enlarged radial thickness.

3. A shaft according to claim 1, wherein said adhesive layer extends to an inner longitudinal end of said sleeve.

4. A shaft according to claim 1, wherein said portion of said body of enlarged radial thickness comprises a plurality of additional plies of solidified fiber reinforced resinous material.

5. A shaft according to claim 4, wherein each of said additional plies is of longer length than the next outer ply.

6. A shaft according to claim 4, wherein said additional plies are covered by an outer ply extending along substantially the entire length of said body.

7. A shaft according to claim 1, wherein a portion of said sleeve is disposed within said shaft body and includes an outer longitudinal end and an inner longitudinal end of at least the same radial thickness as said outer longitudinal end.

8. A hollow tubular fiber reinforced composite shaft comprising:
   a shaft body comprising a plurality of integrally bonded circumferential plies of solidified fiber reinforced resinous material,
   a metal sleeve mounted in at least one longitudinal end of said shaft body,
   a layer of adhesive material disposed radially between a radially outer surface of said metal sleeve and a radially inner surface of a radially innermost ply of said shaft body to bond said sleeve to said body,
   said radially innermost ply and said adhesive layer overlying substantially the entire portion of said outer surface disposed within said shaft body,
   said portion of said sleeve including:
      an outer longitudinal end, and
      an inner longitudinal end of at least the same radial thickness as said outer longitudinal end,
   a portion of said body located adjacent an inner longitudinal end of said adhesive layer and in overlying relation to said inner longitudinal sleeve end as viewed in a radially inward direction being of enlarged radial thickness relative to the remainder of said body disposed longitudinally outwardly of said enlarged thickness portion.

9. A shaft according to claim 8, wherein said inner longitudinal end of said sleeve is of greater radial thickness than said outer longitudinal end of said sleeve.

* * * * *